Patented Oct. 5, 1948

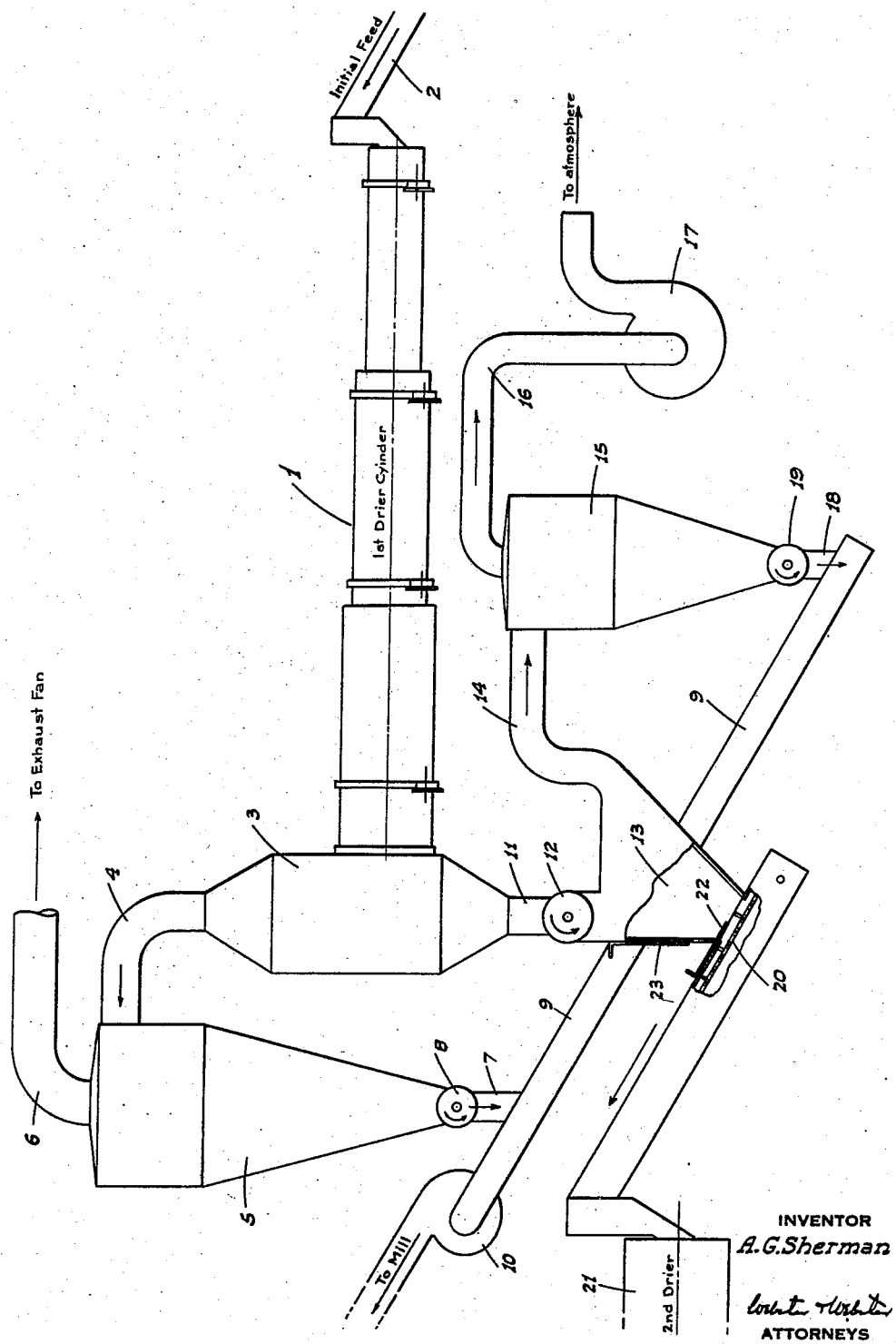

2,450,843

UNITED STATES PATENT OFFICE 2,450,843

DEHYDRATING SYSTEM

Arthur G. Sherman, Tracy, Calif.

Application October 6, 1945, Serial No. 620,786

2 Claims. (Cl. 34—57)

This invention relates in general to an improved dehydrating system especially designed for use to dehydrate cut green leaf crops, such as alfalfa, preparatory to milling the same for animal and poultry feed.

In particular the invention is directed to, and it is an object to provide, a novel dehydrating system which is operative to separate, after initial dehydration of the crop material, the leaves from the stems, and to then subject the latter to further dehydration as is necessary to reduce the moisture content of said stems to approximately that of the leaves after the initial dehydration thereof.

This further dehydration of the stems is desirable and advantageous for the reason that a relatively low and constant moisture content may be maintained in the feed as milled. It is not practical or economical to subject the admixed and initially dehydrated leaves and stems to the additional dehydration necessary to reduce the stems to proper moisture content, as the leaves are then dried excessively with unnecessary loss of valuable constituents.

It is another object of the present invention to provide a leaf crop dehydrating system of the type described, which includes unique mechanical apparatus arranged to effectively separate the leaves and stems after initial dehydration thereof while admixed, and to then separately convey the stems to a secondary dehydrator cylinder assembly for subsequent drying.

An additional object of the invention is to provide a leaf crop dehydrating system wherein processing of the crop is expedited; capacity increased; and the resulting product improved in quality.

A further object of the invention is to produce a simple and inexpensive dehydrating system, and yet one which will be exceedingly effective for the purpose for which it is designed.

These objects are accomplished by means of such structure and relative arrangement of parts as will fully appear by a perusal of the following specification and claims.

The figure of the drawings is a diagrammatic elevation of the improved dehydrating system.

Referring now more particularly to the characters of reference on the drawings, the improved dehydrating system for cut green leaf crops, such as alfalfa, comprises an elongated dehydrator cylinder assembly, indicated at 1; there being an initial feed conveyor 2 arranged to deliver cut green leaf crops into the intake end of said dehydrator cylinder assembly 1. At its opposite end the dehydrator cylinder assembly 1 discharges into a vertically disposed, cylindrical material separating chamber or "wind box," indicated at 3; said chamber 3 tapering at top and bottom, as shown.

At the top the separating chamber 3 is connected by an elbow conduit 4 into a cyclone 5 having a top conduit 6 leading to an exhaust or suction fan (not shown). At the bottom the cyclone 5 includes a bottom conduit 7 having a rotary feeder 8 interposed therein; said bottom conduit 7 delivering into the upper end portion of an elevator conveyor 9. At its upper end the elevator conveyor 9 discharges into a blower or feed fan 10 which delivers to the mill.

At the bottom the separating chamber 3 includes a bottom conduit 11 having a rotary feeder 12 interposed therein; the conduit 11 discharging into the upper end of a hopper-shaped, material separating chamber or "wind box" 13. An elbow conduit 14 leads from the separating chamber 13 at the top and in spaced relation to the conduit 11; said elbow conduit leading into another cyclone 15 having a top conduit 16 connected to an exhaust or suction fan 17.

At the bottom the cyclone 15 includes a bottom conduit 18 having a rotary feeder 19 therein, and which bottom conduit discharges into the elevator conveyor 9 adjacent the lower end of the latter.

At the bottom the hopper-shaped material separating chamber 13 communicates with the lower end of another elevator conveyor 20 which discharges at its upper end into a secondary dehydrator cylinder assembly, shown in part at 21. At the opposite end said secondary dehydrator cylinder assembly includes means (not shown) to convey material from said assembly to the mill.

Flow of material from the hopper-shaped material separating chamber 13 into the elevator conveyor 20 is adjustably controlled by a slide valve 22, and another slide valve 23 on one side of said separating chamber 13 adjustably regulates air flow into said chamber.

In operation the above described dehydrating system functions as follows:

The cut green leaf crop is initially dehydrated as it passes through the dehydrator cylinder assembly 1, and which initial dehydration causes the leaves to readily separate from the stems.

From the discharge end of the dehydrator cylinder assembly the initially dehydrated and admixed leaves and stems feed into the separating chamber 3 in which there is a very strong up-draft of air. This up-draft carries with it a major portion of the dehydrated leaves which pass into the cyclone 5, fall to the bottom thereof, and thence are fed by the rotary feeder 8 into the elevator conveyor 9 for passage into the mill through the medium of the blower or feed fan 10.

The relatively heavier stems which require supplementary dehydration, together with a certain amount of leaves, fall to the bottom of the separating chamber 3 and are fed by the rotary feeder 12 into the hopper-shaped separating chamber 13. Here again there is a relatively sharp up-draft in the chamber 13, by reason of which the leaves which gain access to said chamber deliver through the elbow conduit 14 to the cyclone 15. In the cyclone the leaves fall to the bottom thereof and are delivered by the rotary feeder 19 into the elevator conveyor 9.

The relatively heavier stems pass downwardly in the separating chamber 13 past the slide valve 22 into the elevator conveyor 20, from whence said stems feed into the secondary dehydrator cylinder assembly 1. From the latter, and after the secondary dehydrating operation, the stems are fed (by means not here shown) into the mill along with the material carried by the elevator conveyor 9 and fed by the fan 10.

As a consequence both the leaves and the stems reach the mill with substantially the same moisture content, which is very desirable to the production of a product of uniform quality.

From the foregoing description it will be readily seen that there has been produced such a dehydrating system as substantially fulfills the objects of the invention, as set forth herein.

While this specification sets forth in detail the present and preferred construction, still in practice such deviations from such detail may be resorted to as do not form a departure from the spirit of the invention, as defined by the appended claims.

Having thus described the invention, the following is claimed as new and useful, and upon which Letters Patent are desired:

1. A dehydrating mechanism for leaf crop material, comprising a substantially horizontally disposed first dehydrating cylinder, a vertically disposed wind box forming a first separating chamber, the dehydrating cylinder discharging into said wind box at right angles thereto, suction means connected with and operative to maintain a suction against the top of the wind box and providing a suction of sufficient strength to remove the leaves from the crop material but insufficient to remove the stems whereby the latter may fall by gravity toward the bottom of the wind box, a second wind box disposed below the first wind box and in vertical alinement therewith and forming a second separating chamber, means to discharge the stems from the first wind box vertically downward and into the second wind box whereby they will fall by gravity to the bottom of said second wind box, suction means connected with and operative to maintain a suction through one side of the second wind box and at right angles to material falling vertically through such wind box and providing a suction of sufficient strength to remove leaves from the falling material but insufficient to remove the stems, conveyor means at the lower end of the second wind box onto which the stems discharge, a second dehydrating chamber, the conveyor delivering into said second dehydrating chamber.

2. A combination as in claim 1, including an air inlet valve in the side of the second wind box opposite that side to which the suction means is connected.

ARTHUR G. SHERMAN.

REFERENCES CITED

The following references are of record in the file of this patent:

UNITED STATES PATENTS

| Number | Name | Date |
|---|---|---|
| 748,893 | Trump | Jan. 5, 1904 |
| 748,894 | Trump | Jan. 5, 1904 |
| 1,934,410 | Cummins | Nov. 7, 1933 |
| 1,973,270 | Schulwitz | Sept. 11, 1934 |
| 1,994,343 | Graves | Mar. 12, 1935 |
| 2,236,006 | Mulvany | Mar. 25, 1941 |

FOREIGN PATENTS

| Number | Country | Date |
|---|---|---|
| 18,742 | Great Britain | Dec. 23, 1909 |